April 3, 1951 F. A. CLARY, JR., ET AL 2,546,977
MANUFACTURE OF STRANDED WIRE CABLES
Filed Feb. 12, 1948 5 Sheets-Sheet 1
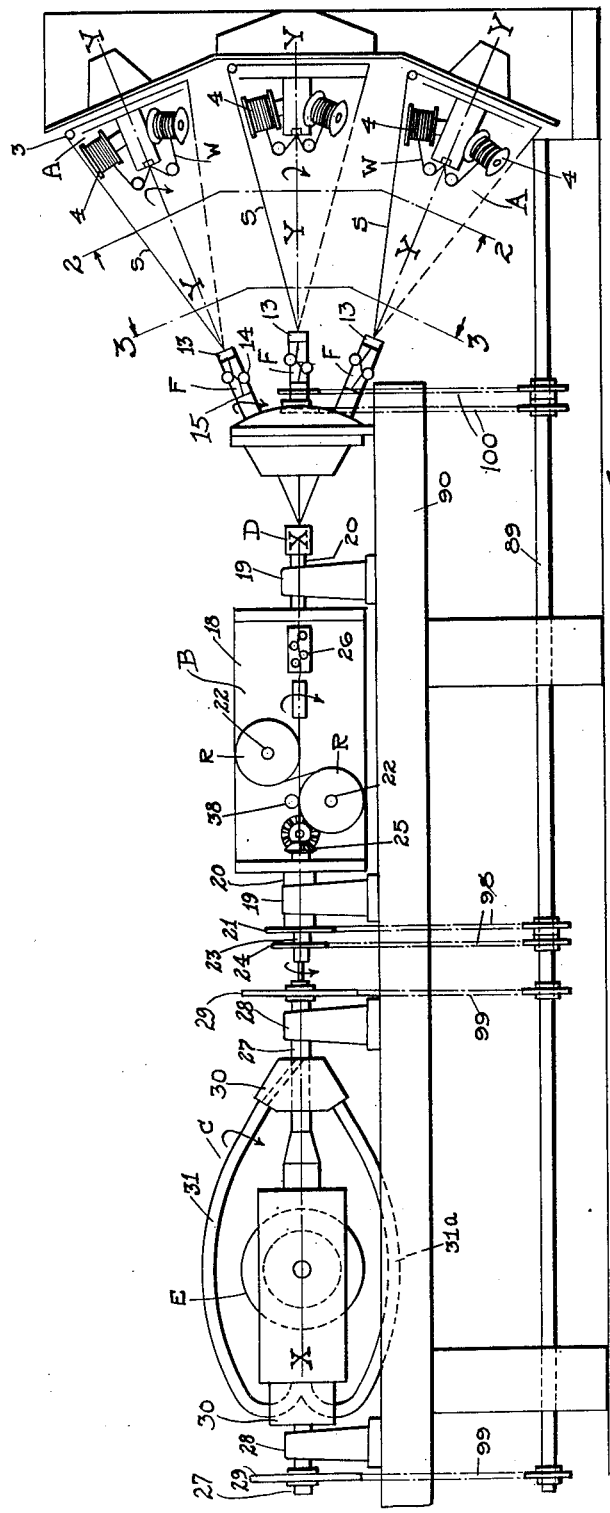
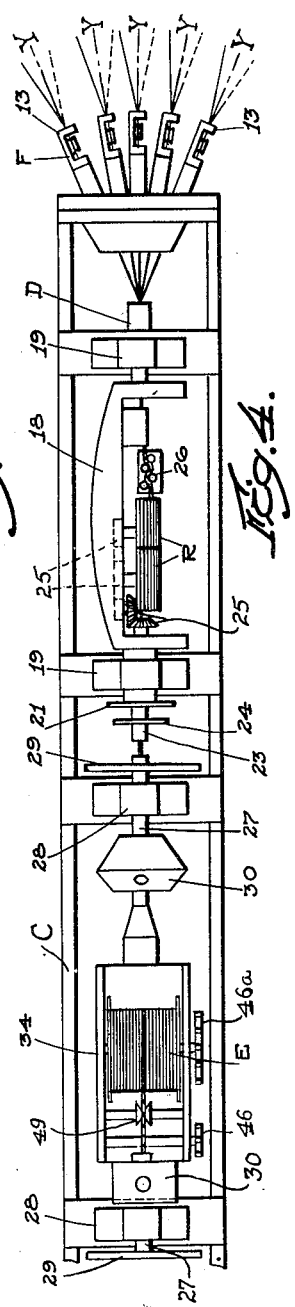
Inventors
Frank A. Clary Jr.
Grant N. Willis
By Owen W. Kennedy
Attorney April 3, 1951  F. A. CLARY, JR., ET AL  2,546,977
MANUFACTURE OF STRANDED WIRE CABLES
Filed Feb. 12, 1948  5 Sheets-Sheet 2

Inventors
Frank A. Clary Jr.
Grant N. Willis
By Owen W. Kennedy
attorney

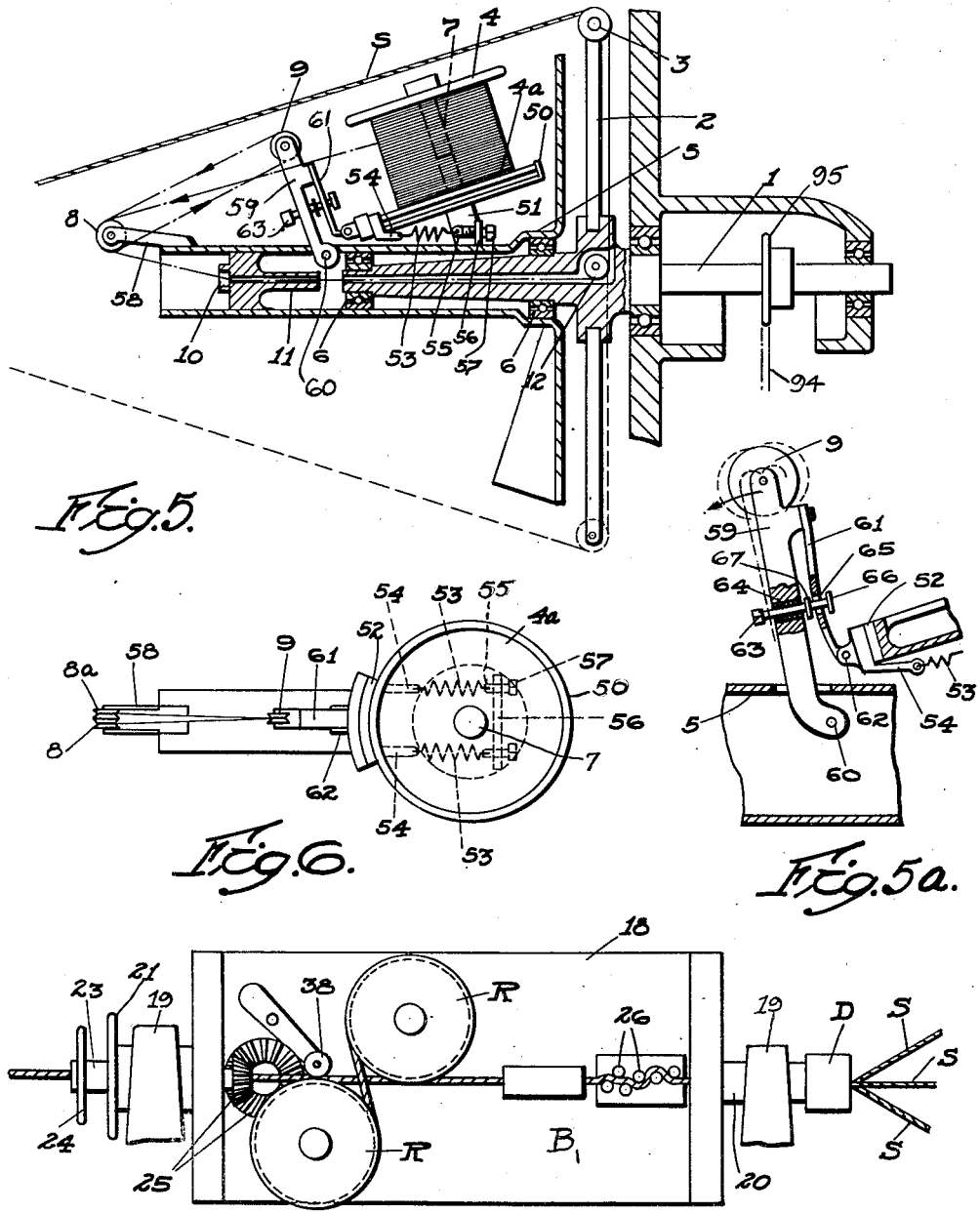

April 3, 1951     F. A. CLARY, JR., ET AL     2,546,977
MANUFACTURE OF STRANDED WIRE CABLES
Filed Feb. 12, 1948     5 Sheets-Sheet 4
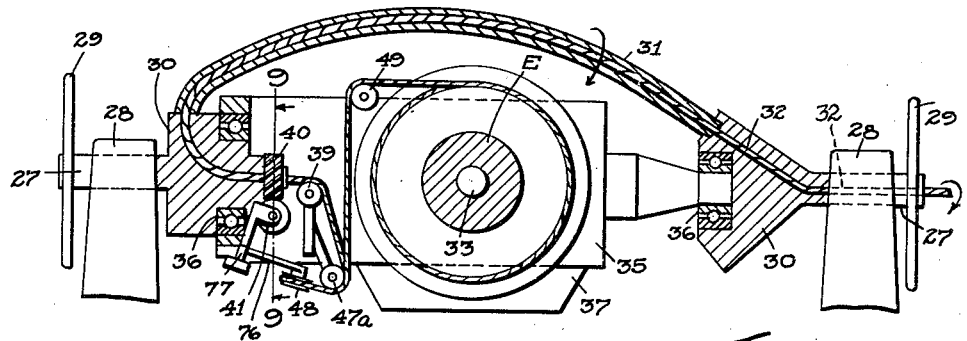

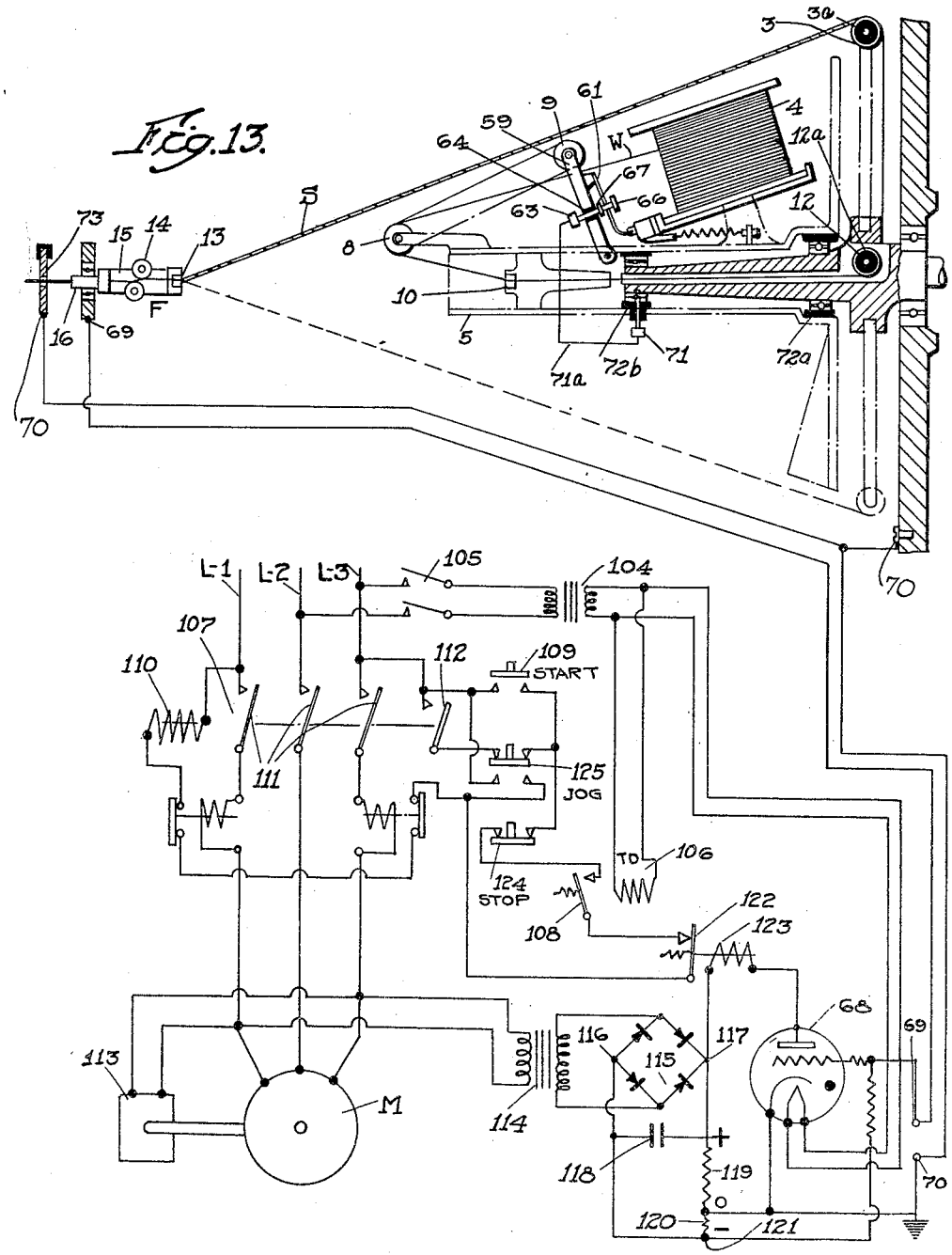

Patented Apr. 3, 1951

2,546,977

UNITED STATES PATENT OFFICE 2,546,977

MANUFACTURE OF STRANDED WIRE CABLES

Frank A. Clary, Jr., and Grant N. Willis, Bristol, Conn., assignors to Johnson Steel & Wire Company, Inc., Worcester, Mass., a corporation of Massachusetts Application February 12, 1948, Serial No. 7,756

21 Claims. (Cl. 57—58)

The present invention relates to the manufacture of stranded wire cable such, for example, as is used for reinforcement of the casings of rubber tires, power transmission belts, and other analogous uses which may require a stranded wire cable of high tensile strength, and of uniform wire lengths, as well as possessing the quality of lying dead when being handled in connection with various manufacturing processes to produce finished tires or belting, as the case may be.

The object of the present invention is to provide an improved machine and method for producing stranded wire cable at a high rate of production, with low labor costs, the machine being particularly characterized by its ability to continuously produce finished wire cable having the required properties, starting with a supply of untwisted wire at one end of the machine, and ending with the storage of finished cable at the other end. As will later appear, the machine of the present invention is so constructed and operated, as to make completed cable at a high rate of production, without moving any heavy masses of metal about an axis of rotation, such as would set up dangerous forces, due to centrifugal action.

Previous machines for the production of stranded cable from metal wire or textile material, usually involve the rotation, at high speeds, of either the supply of raw material, in the form of untwisted wire or yarn, or the storage spool for the completed cable. Due to the weight of the wire in its untwisted form, or as a completed cable, it has been difficult to obtain a high rate of cable production, without involving the movement of heavy masses of metal at dangerously high speeds, or without building extremely massive machinery, of which the first cost is too high to obtain higher production on an economical basis. In contrast to previous constructions, the machine of the present invention provides a number of individual wire stranders, each involving the stationary support of the untwisted wire supply, with respect to the twisting axis, which stranders are adapted to continuously deliver twisted strands to a cable closing device which, in turn, delivers completely laid cable to a storage spool that is stationary with respect to the cable twisting axis. As a result, completely twisted cable is manufactured continuously at a high rate of production, without moving either the wire supply, or the stored cable, about a rotational axis.

As previously pointed out, the present machine and method will produce wire cable for use in rubber tire casings or belting, that will lie dead when handled preparatory to its incorporation in the finished product. Due to the tendency of twisted wire cable to coil, or to remain alive, the machine of the present invention incorporates effective means to insure the killing of the completed cable, as well as the individual twisted strands entering into the cable, so that the completed cable will lie dead when cut into any desired lengths, and used in the manufacture of tire casings or belting.

Another factor entering into the manufacture of wire cable comprising a number of twisted strands, for use in tire casings or belting, is the requirement that each piece of finished cable be composed of individual wires of equal length. According to the present invention, this requirement is met by subjecting all of the wires entering into the completed cable to the pull of a single flying capstan, while subjecting all the individual supplies of wire to the action of automatically operating tension control devices. As a result, any piece of completed cable will be composed of individual wires of equal length, so that tensile stresses will be uniformly distributed throughout each piece of cable.

The above and other advantageous features of the present machine and method will be hereinafter pointed out in detail in the following description considered in connection with the accompanying drawings, in which Fig. 1 is a view in side elevation of a complete machine for continuously producing wire cable from individual supplies of wire, with certain parts being shown in section.

Fig. 4 is a fragmentary plan view of the machine shown in Fig. 1, but with the tube element 31 removed so as to illustrate the storage drum more clearly.

Fig. 5 is a detail view of one of the stranders shown in Fig. 1, illustrating the tension control for the wire, as well as the stop motion for the machine.

Fig. 5a is an enlarged showing of the tension control.

Fig. 6 is a plan view of a portion of the parts shown in Fig. 5.

Fig. 7 is a fragmentary vertical sectional view of the cable storing flyer of Fig. 1, on an enlarged scale, and with the dummy tube 31a removed.

Fig. 8 is a plan view of the parts shown in Fig. 7 but with the tube 31 removed.

Fig. 9 is a sectional view along the line 9—9 of Fig. 7, looking in the direction of the arrows.

Fig. 9a is a horizontal section along the line 9a—9a of Fig. 9.

Fig. 12 is a view in side elevation of the capstan shown in Fig. 1, on an enlarged scale.

Fig. 13 is a wiring diagram of the control circuit for the driving motor.

Referring to Fig. 1, there will be first described the general layout and mode of operation of the entire machine, without reference to details of the various mechanisms which enter into the machine. Briefly stated, the machine consists of a number of individual wire stranders A of identical construction, with the stranders being arranged around an axis X—X about which a cable flyer C is rotatably driven to form cable from twisted wire strands S delivered by the stranders A, with the strands S converging upon a closing die D located on the axis X—X between a flying capstan unit B and the stranders A. Each strander A has associated therewith a false twister F through which the strand S passes on its way to the closing die D, so as to render the strand inert. The flying capstan B is also rotatable about the axis X—X in unison with the flyer C, although at a different rotative speed, so that finished cable consisting of a number of twisted strands S, is delivered to a storage spool E located inside the flyer C, and relatively stationary with respect to the flyer axis X—X.

Figure 2:
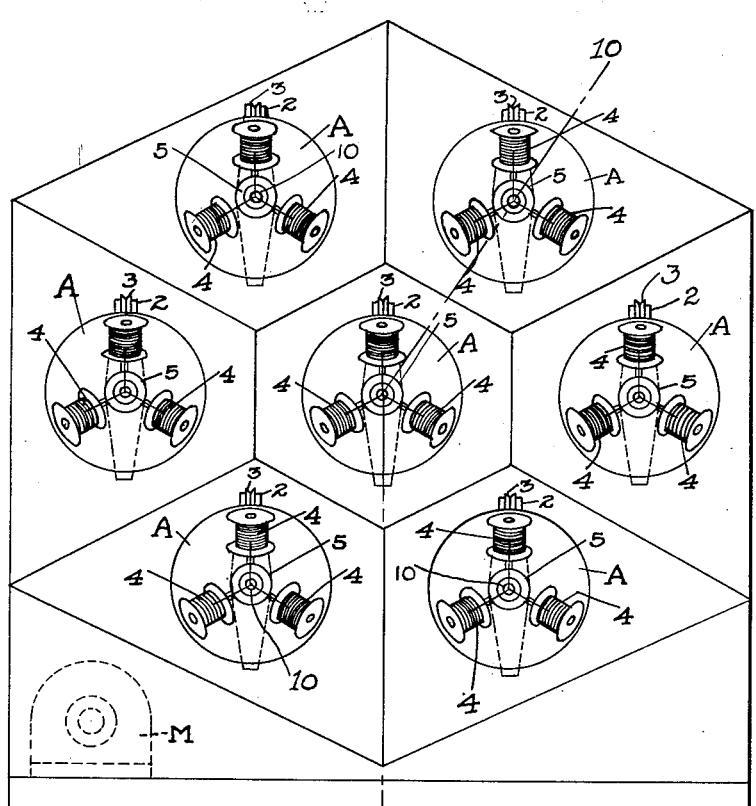
Fig. 2 is a view in end elevation of all of the individual stranders shown in Fig. 1, as viewed from the left, along the line 2—2, on an enlarged scale.

As shown in the right-hand portion of Fig. 1, the stranders A are in the form of separate units, of identical construction, and a number of these strander units are positioned in front of the closing die D. Fig. 2 shows the arrangement of stranders A about the axis X—X, with the number of stranders A depending upon the number of twisted wire strands S to be incorporated in the finished cable that is to be wound on the storage spool E, seven stranders being shown.

Each strander A consists of a rotatably driven spindle 1 carrying a flyer 2 in the form of an arm having a pulley or guide 3 mounted at its end for the passage of a strand S, containing a number of separate wires W. In order to balance the machine, the flyer 2 provides two arms extending in opposite directions with respect to the spindle 1, and obviously the flyer could be made in the form of a solid disk if desired, with the pulley 3 mounted at a point on its periphery.

As best shown in Figs. 2 and 5, there are three wires W in the strand S, and these wires W are supplied from spools 4 arranged symmetrically about the axis of rotation of the spindle 1. The several spools 4 are carried by a cradle 5 that is supported freely on the outside of the spindle 1 by bearings 6. Each spool 4 is mounted for rotation on a pin 7 extending radially from the center of the cradle 5, and during the operation of the machine, the cradle 5 rides in the position of Fig. 2.

While the cradle 5, with the spools 4, is relatively free to turn about the axis of the spindle 1, with the spools 4 in approximate balance, a counterweight below the spindle axis Y—Y holds the cradle against rotation in the position of Fig. 2, wherein the heavy mass of metal represented by the several spools 4 of untwisted wire W is, to all intents and purposes, stationary with respect to the flyer 2 which is driven at a relatively high speed. At the same time, while the mass of metal on the spools 4 remains stationary with respect to the rotation of the flyer 2, each individual spool 4 is capable of turning on the axis of its supporting pin 7 to permit the wire W to unwind from the spool, in response to a pull on all of the strands S through rotation of capstan rolls R, forming part of the flying capstan unit B later described in detail.

The untwisted wire W from each spool 4 passes forwardly around a pulley 8 mounted to turn on a fixed axis at the front end of the cradle 5, from which pulley 8 it passes around a second pulley 9 forming part of an automatically functioning tension control device which cooperates with the spool 4 to cause the wire to unwind evenly from the spool. This tension control device is later described in detail with reference to Figs. 5 and 6, and it is sufficient to state at this point that after passing around the pulley 9, the wire W passes around a third pulley 8a mounted beside the first pulley 8, which serves to conduct the wire to a closing die 10 located at the front end of the cradle 5. Therefore, all three wires W from the spools 4 converge upon the die 10, and a strand twist occurs at this point, the degree of which is determined by the rotational speed of the spindle 1 and the rate at which the wire is pulled off the spools 4 by the rotatably driven capstan rolls R.

Figure 3:
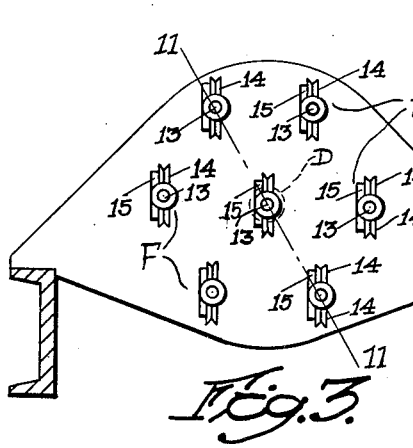
Fig. 3 is a view in end elevation of the false twisters shown in Fig. 1, as viewed from the right, along the line 3—3, on an enlarged scale.

From the die 10, the strand S passes through a tube 11 which conducts it to the center of the spindle 1, and then around a pulley 12 rotatably mounted on the spindle 1, from which pulley 12 the strand passes radially outward to the guide pulley 3 at the end of the flyer arm 2. From this point, the strand S passes downwardly and forwardly outside of the spools 4 and cradle 5 to a strand closing die 13, shown in Fig. 1 as being located on the strander axis Y—Y. It is to be noted that the machine provides a number of such strand closing dies 13 each located on its strander axis Y—Y, in accordance with the number of stranders A which are employed in the machine, with all of the strands S converging upon the cable closing die D, which is indicated in dotted lines in Fig. 3.

With the above described strander construction, rotation of the flyer 2 about the axis Y—Y will impart a double twist to the several wires W as the latter are drawn off of the spools 4 by the capstan rolls R, with the number of twists per minute being twice the speed of rotation of the spindle 1. It has been found that the spindle speed can be as high as 3500 R. P. M., so that each strand S can be twisted at a rate of at least 7000 twists per minute, without setting up any dangerous centrifugal forces, due to the fact that the cradle 5 carrying the wire supply spools 4, is stationary, in so far as rotation of the spindle 1 is concerned.

As previously pointed out, each strander A has associated therewith a false twister F, as indicated in the general layout of Fig. 1. The purpose of this false twister F is to render each twisted strand S inert before entering the cable closing die D, upon which all of the strands S converge after passing through the false twisters. Generally speaking, the principle of false twisting involves the rotation of a bend in the strand, while holding the ends of the bend about an axis, at fixed points on the rotational axis. For each complete revolution of the bend, a twist is put in the strand at one end, and is removed at the opposite end, because the twisting actions at the two ends are in opposite relation to the fixed points where the strand is held.

In the present machine, each false twister F consists of a pair of pulleys 14 that are mounted for free rotation on a carrier 15 that is positively driven about the axis Y—Y. The twisted strand S passes back and forth between the pulleys 14 in the form of a figure 8, so that as the pulleys 14 revolve bodily about the axis Y—Y, a twist will be put in the strand between the stranding flyer pulley 3 and one false twister pulley 14, which twist will be removed from the strand between the other false twister pulley 14 and the cable closing die D. The net result of the passage of a strand S through the false twister F is to take the spring or torsion out of the strand S so that it enters the cable closing die D in an inert or dead condition.

Figure 11:
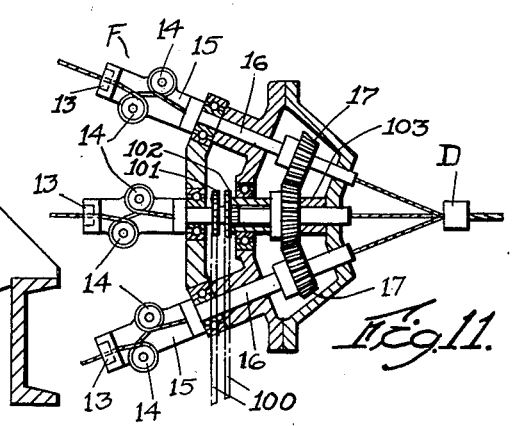
Fig. 11 is a sectional view along the line 11—11 of Fig. 3.

As indicated in Fig. 11, the carrier 15 for each pair of false twister pulleys 14, as well as for the die 13, is mounted on a spindle 16, and all the spindles 16 are driven in unison at the same speed by gearing 17. The spindles 16 are hollow to permit the passage of the strands S therethrough, as they leave the pulleys 14, so that all of the twisted strands S arrive at the cable closing die D in an inert or dead condition, due to the uniform action of the false twisters thereon.

As indicated in Fig. 1, the carrier 15 of each false twister F is driven in the same direction of rotation as the flyer 2 of each strander A. The particular speeds at which the flyer spindle 1 and the false twister spindle 16 shall be driven in order to produce a specified strand twist will be later discussed in detail.

As previously pointed out, the draft necessary to pull the individual wires W from the spools 4 through the flyer 2 and the false twister F is produced by the rotation of capstan rolls R forming part of the flying capstan unit B. The capstan unit B consists of an elongated body 18 supported between bearings 19 by trunnions 20, with the left-hand trunnion 20 carrying a driving sprocket 21, while the right-hand trunnion 20 carries the cable closing die D, upon which all of the twisted strands S converge. The cable is formed at this point, and the rotation of the flyer C about the axis X—X imparts the desired cable lay twist to the strands S as they are drawn through the body 18 by rotation of the capstan rolls R, simultaneously with the revolution of the rolls about the axis X—X.

In order to positively rotate the rolls R on their shafts 22, a spindle 23 is rotatable inside the left-hand trunnion 20, this spindle 23 being driven by a sprocket 24 at a speed greater than the speed at which the capstan body 18 is driven from the sprocket 21. The spindle 23 extends through the bearing 19 into the capstan body 18, and is connected by suitable gearing 25 to the capstan roll shafts 22, see Fig. 12.

The twisted cable passes back and forth around the capstan rolls R for a number of turns, and the higher speed of rotation of the spindle 23, with respect to the speed of rotation of the capstan body 18, causes the rolls R to be positively driven and thereby draw the several twisted strands S into the cable closing die D. This pull is accompanied by closing and laying of the strands S into a cable, with the cable lay twist depending upon the speed of the flyer C and the rate of movement of the cable by the rolls R. The particular speed at which the flyer C shall be driven in order to produce a specified cable lay twist will be later discussed in detail.

In its passage from the closing die D to the capstan rolls R, the twisted cable is subjected to the action of killing rolls 26 that are mounted on and turnable with the capstan body 18. These killing rolls 26 are freely rotatable, and are arranged so as to face each other in staggered relation, thereby causing the cable passing between the rolls to be flexed in opposite directions. The rolls 26 are arranged in two sets with their axes at right angles to each other, and the rolls will function in the manner of a conventional wire straightener to kill the torsion or spring in the cable, so that the twisted cable will emerge from the hollow spindle 23 at the end of the flying capstan unit B, in an inert or dead condition.

As noted hereinabove, the flyer C imparts the desired twist to the cable. However, due to the fact that the capstan unit B is rotated in the same direction as the flyer C and at a speed which is equal to the cable twisting speed, the actual laying of the cable is effected at the closing die D which is located between the capstan unit B and the false twisters F. Although it is a primary purpose of the capstan unit B to feed the cable through the machine, it also has a secondary purpose, and that is to deliver the cable on to the stationary cable storage spool E without damaging the cable in its travel to the spool, and so that the cable will pass readily and with little friction through the guiding tube 31.

As best shown at the left-hand end of Fig. 1, and in the plan view of Fig. 4, the cable storing flyer C consists of a pair of aligned spindles 27 extending along the axis X—X and mounted in bearings 28. The spindles 27 are driven at exactly the same speed through sprockets 29, and each spindle carries a head 30 for receiving one end of a cable guiding tube 31 having a special form which will be described later. Rotation of the spindles 27 in unison at the same speed will, therefore, cause the tube 31 to revolve about the axis X—X, and it is to be noted that the right-hand spindle 27 provides a passage 32 extending along the axis X—X and connecting with the right-hand end of the tube 31, as shown in section in Fig. 7.

The storage spool E is mounted on a shaft 33 extending at right angles to the axis X—X, and the ends of the shaft 33 are mounted between the sides 34 of a cradle 35 that is supported freely between the heads 30 by bearings 36. The bottom of the cradle 35 provides a weight 37 which tends to stabilize the cradle and keep the spool shaft 33 always substantially horizontal, as rotation of the heads 30 carries the tube 31 around the spool E to deliver the cable to the spool with the requisite amount of permanent twist.

An important factor in the ability of the machine to store the cable on the spool E without altering the cable twist, resides in the ability of the capstan rolls R to deliver the finished cable to the closing flyer C at full closing speed. It is to be noted that a pinch roll 38 cooperates with the left-hand capstan roll R at its point of tangency along the axis X—X, so that the finished cable leaves the flying capstan unit without needing any pull to draw it off; in fact, the cable will feed directly out of the capstan rolls R. Therefore, the storage spool E is frictionally driven, as later described, so as to exert only enough pull on the cable to wind it on the spool, at its delivery rate, without interfering with the necessary self-rotation of the cable in the flyer tube 31. The tension in the cable at the spool E is only one pound, as compared to at least forty pounds tension developed by the rotation of the capstan rolls R, in order to pull the wires W from the several sets of supply spools 4, then the several strands through the false twisters F, and finally the twisted cable through the killing rolls 26.

As noted hereinabove, although the flyer C actually twists the cable, due to the rotation of the capstan B in the same direction as the flyer C, the cable lay is actually produced at the die D. Thus, as the cable emerges from the flying capstan unit B, the cable itself is rotating at the speed of the capstan body 18, while the flyer C is effective actually to twist the left-hand end of the cable in a manner such that the requisite cable lay is produced. However, the relative speeds of the flyer C and the capstan unit B are such that no apparent twisting of the cable is produced between these two devices as the cable passes through the tube 31 to a pulley 39 mounted on cradle 35. This pulley 39 serves to guide the cable first through a tension control device and then to the spool E, with the cable then being free of self-rotation, and having its original twist undisturbed, all as shown in Fig. 7.

In order to prevent the formation of any relative cable twist between the capstan B and flyer C, the capstan body 18 is driven at twice the speed of the flyer C, but in the same direction as the latter. This rotation of the capstan B is in the same direction as the direction of self-rotation of the cable, as indicated by the arrows in Fig. 1, so that each complete revolution of the loop of cable in the tube 31 produces two turns of cable twist produced by revolution of the flyer C at one-half the speed of the capstan B. While the normal effect of a revolving loop is to obtain a double twisting action at two separate points at the ends of the loop, as for example between the dies 10 and 13 in each strander A, the action is different with respect to the flyer C, because of the fact that the cable is capable of self-rotation during its entire passage through the flyer tube 31 between its point of entry at the right-hand flyer spindle 27 and the pulley 39 on the stationary cradle 35. As a result of the complete freedom of the cable to rotate as it enters the spindle 27 at the right-hand end of the revolving loop, the twist generated at the second twist point represented by the fixed pulley 39 at the left-hand end of the loop, is able to progress back along the cable as fast as it is generated. As a result, no temporary untwisting of the cable occurs, because self-rotation of the cable originating at the second twist point represented by fixed pulley 39, adds itself continuously to the rotation of flyer C to produce, at the entrance to the flyer spindle 27, a full twisting effect such as to exactly match and cancel the speed at which the cable itself is rotating as it leaves the flying capstan unit B, under its own power so to speak, and enters the right-hand spindle 27 freely, without being subject to any retarding forces as it enters the right-hand end of the revolving loop in the tube 31.

It is to be noted at this point that the operation of the cable storing flyer C differs radically from the operation of a conventional revolving loop flyer, wherein a double twisting occurs between fixed points at opposite ends of the loop, as, for example, in the operation of the flyer 2 of each strander A. In the arrangement described above, with reference to the flyer C, the right-hand end of the loop in the tube 31 is free as the self-rotating cable is fed into the spindle 27, and the tube 31 is so designed as to present easy curves to the passage of the cable without substantial resistance to its self-rotation. As a result, the cable arrives at the pulley 39 after its passage through the tube 31, without any self-rotation at that point, and without any untwisting of the cable strands having occurred during its passage through the tube.

As best shown in Fig. 7, the inside diameter of the tube 31 is just enough greater than the diameter of the cable therein, so that the cable moves easily therein, while being free to turn on its own axis from the time it enters the right-hand end of the tube until it reaches the pulley 39. In order that the flyer C may operate at high speed in complete balance, a second tube 31a extends between the flyer heads 30, which tube 31a has the same form as the tube 31. The weight of the tube 31a is made equal to the combined weights of the tube 31 and the cable therein, so that the complete flyer C is absolutely symmetrical, with respect to the rotational axis X—X, see Fig. 1.

Since the capstan rolls R do not carry any appreciable weight of cable, this unit can be operated safely at the high speed necessary to obtain the final cable twist. As previously pointed out, the higher speed of rotation of the spindle 23, with respect to the speed of rotation of the capstan body 18, causes the rolls R to be positively driven and thereby draw the several twisted strands S into the cable closing die. This positive drive of the rolls R generates a relatively high tension in the cable sufficient to pull it through the false twisters F and the two sets of killing rolls 26. The tension in the strands S works back through the individual wires W, so that all of the wires W entering into the completed cable are subjected to the same tension to cause unwinding of the wires W from the supply spools 4. Therefore, the mounting of the capstan rolls R in a rotating unit B, separate from the cable storing flyer C, enables the completed cable to be delivered to the tube 31 beyond the rolls R without any tension therein, so that the above described self-rotation of the cable within the tube 31 is possible.

As previously noted, the storage spool E, mounted in the cradle 35, is frictionally driven so as to be rotated on the axis of its shaft 33 at a speed sufficient only to wind the completed cable on the spool E, without substantial tension, as the cable is delivered to the pulley 39, by the capstan rolls R. The drive for the spool E is obtained from a helical gear 40 mounted on the end of the left-hand spindle 27 of the closing flyer C, which gear 40 is in mesh with a helical gear 41 carried by a countershaft 42a that is mounted at one side of the cradle 35, as best shown in Fig. 9. A second countershaft 42 is in alinement with shaft 42a, and a friction clutch 43 is interposed between the gear 41 and the end of shaft 42, which also carries one of two intermeshing gears 44, the other of which is mounted on a short shaft 45 extending from one side of the cradle 35 above and parallel to the countershafts. The shaft 45 extends through the side of the cradle 35 and carries a sprocket 46 connected to a second sprocket 46a on the spool shaft 33 by a chain indicated in dot and dash lines in Fig. 8.

The clutch 43 is automatically operated so as to transmit only enough power to the spool shaft 33 to cause rotation of the spool E to wind the completed cable thereon at the delivery rate of the capstan rolls R, without subjecting the cable to any appreciable tension, such as would interfere with its free self-rotation within the tube 31. In its travel between the pulley 39 and the storage spool E, the cable passes around a guide pulley 47 and a tension control pulley 48, the function of which is later described, after which the cable passes to a laying pulley 49 that is adapted to be traversed, with respect to the spool E, to build up the cable thereon uniformly. The cable laying pulley 49 is mounted on a reversing screw shaft 49a that is driven in unison with the spool shaft 33, in any suitable manner. This imparts a back and forth traversing movement to the pulley 49, as is usual in winding devices of this character.

As previously pointed out, each strander A provides an arrangement for automatically controlling the unwinding of wire W from each spool 4, in accordance with the tension, or pull, as applied to the wire by the rotation of the capstan rolls R. The object of this arrangement is to insure that the three wires entering into each strand S will be drawn off uniformly, so that in any given length of strand S, the wires W therein will be all of the same length.

As best shown in Fig. 5, each spool 4 is mounted on a carrier 50 that closely fits one head 4a of the spool, so that the carrier 50 and its spool is supported, as a unit, for rotation on the pin 7 which extends outwardly from a lug 51 forming part of the cradle 5. The periphery of the carrier 50 is adapted to be engaged by a brake shoe 52, which is yieldingly held in engagement with the carrier by a pair of springs 53.

As best shown in detail view of Fig. 6, the springs 53 extend underneath the carrier 50 on opposite sides of the pin 7, with the ends of each spring 53 connected to a lug 54 forming part of the brake shoe 52 and to an eye-bolt 55 passing through a fixed plate 56 on the cradle 5. A nut 57 cooperates with each eye-bolt 55, so that the tension of each spring 53 may be adjusted to balance the pull on the brake shoe 52 and to cause the brake shoe to frictionally engage the carrier 50 and exert an initial retarding force opposing free rotation of the spool 4. The initial adjustment of the springs 53 is such as to hold the spool 4 stationary on the pin 7, in the absence of any tension applied to the wire W to pull it off of the spool.

The wire W leads from the spool 4 to the fixed pulley 8 mounted on a bracket 58 projecting from the front end of the cradle 5. As previously noted, the wire, after passing around the pulley 8, goes to the pulley 9 which forms part of the tension control device that cooperates with the brake mechanism, described above, to automatically determine the amount of braking force applied to the spool carrier 50, in accordance with the tension in the wire. For this purpose, the pulley 9 is mounted for free rotation at the end of an arm 59 turnable on a fixed pivot 60 provided by the cradle 5. Since the wire W passes around the pulley 9 before again passing over the second pulley 8a on its way to the strand closing die 10, the arm 59 is subjected to a turning force in the direction of the arrow in Fig. 5a, the degree of which force is a measure of the tension in the wire as it is drawn off of the spool 4 by the pull of the capstan rolls R.

The pulley arm 59 carries a leaf spring 61 extending in the direction of the brake shoe 52 and having its free end connected to the brake shoe by a pin 62. Therefore, any turning movement of the arm 59 in the direction of the arrow, under the pull of the wire W, will cause the application of a force through the spring 61, tending to lessen the pressure exerted by the brake shoe 52 against the carrier 50 under the pull of the springs 53.

Assuming that the tension of the springs 53 has been adjusted to hold the spool stationary, when wire is not being drawn off, it is apparent that a pull applied to the wire will cause this braking force to be reduced. The amount that the arm 59 turns about its pivot 60, in response to the pull on the wire, will, in turn, flex the spring 61 and cause a certain amount of this force to be transmitted to the brake shoe 52, and thereby ease the pressure of the brake shoe on the spool carrier 50. The net result is that the retarding force applied to the spool 4 through the carrier 50 varies with the pull on the wire, so that the wire will be drawn off the spool 4 uniformly.

In view of the foregoing, it is obvious that the arm 59 carrying the pulley 9 is, at all times, responsive to the pull on the wire W. Therefore, the arm 59 will, during the normal operation of the strander, occupy some intermediate position between the two extreme positions indicated in dotted lines in Fig. 5a, which dotted line positions illustrate abnormal conditions of operation.

Should the wire break, the arm 59 will move to the right, under the pull of the springs 53, whereas should an excessive pull be developed in the wire, due to binding or a snarl in the spool 4, the arm 59 will move to the left. Since the occurrence of either of these abnormal conditions should be followed promptly by stoppage of the machine, the present invention contemplates the provision of an electrically controlled stop motion responsive to movement of the arm 59 into either of the extreme dotted line positions shown in Fig. 5a.

For this purpose, the arm 59 carries a contact stud 63 electrically insulated therefrom at 64, with the stud 63 passing through an opening 65 in the spring 61. As best shown in Fig. 5a, the opening 65 is considerably larger than the stud 63 which carries contact disks 66 and 67 on opposite sides of the spring 61. These disks 66 and 67 are of greater diameter than the opening 65 in the spring 61, but during normal operation of the strander, the disks do not engage the spring. However, from the foregoing description of the functioning of the arm 59 in response to the pull on the wire W, it is obvious that one or the other of the contact disks 66 or 67 will engage the spring should the arm 59 move to either of the extreme positions indicated in dotted lines in Fig. 5a.

Figure 10:
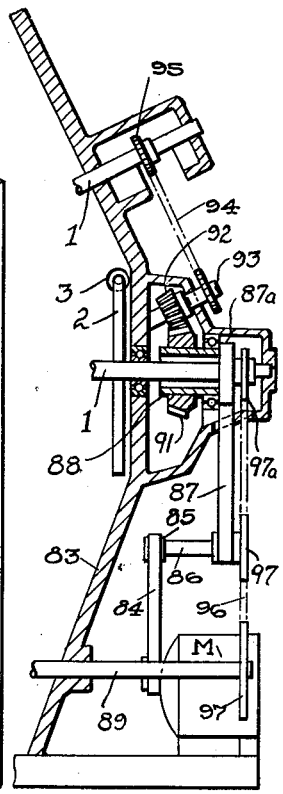
Fig. 10 is a sectional view along the line 10—10 of Fig. 2.

The stud 63 and the contact disks 66 and 67 constitute part of an electrical control circuit for disconnecting and stopping the driving motor for the entire machine, which motor is indicated at M in Fig. 10. This control circuit is indicated diagrammatically in Fig. 13, which also shows associated portions of the strander which enter into the automatic functioning of the complete motor control. As will later appear, the control circuit functions to automatically disconnect the driving motor M, and to apply a suitable brake to bring the entire machine to a quick stop upon the occurrence of any of the abnormal conditions previously referred to, such as a break in the individual wires of a strander A, the development of excessive tension in any wire, or the occurrence of a break in a completed strand S.

For purposes of illustration, the control circuit is shown as comprising a quick-acting relay 68 in the form of an electronic tube shown in Fig. 13 as providing terminals 69 and 70 leading to the strander and forming part of the electrical circuit which includes the stud 63 and the contact disks 66 and 67. As will later appear, the functioning of the tube 68 in the motor control circuit is such as to automatically stop the machine whenever the terminals 69 and 70 become electrically connected together as a result of the occurrence of any of the abnormal conditions previously referred to with reference to the operation of the strander.

As indicated in Fig. 13, in which only related parts of the strander are shown, the tube terminal 69 is in continuous electrical contact with the moving strand S, and one way of accomplishing this result is by connecting the terminal 69 to the frame or housing which carries the false twister pulleys 14. With this connection, the terminal 69 will always be in electrical contact with the strand S through the pulleys 14, carrier 15, spindle 16, and the spindle bearings.

The other tube terminal 70 is connected to the frame member on which the strander spindle 1 is mounted, and this terminal is in electrical connection with the stud 63 carrying the contact disks 66 and 67, through the strander frame to the spindle 1, through its bearings, and then along the spindle to the outside bearing 6 for the cradle 5 to a contact post 71 connected to this bearing. A flexible lead 71a connects the post 71 to the stud 63, and during normal operation of the strander, the tube control circuit is open at this point because the contact disks 66 and 67 are out of engagement with the spring 61.

The spring 61 is in electrical connection with the other side of the tube control circuit, as represented by the terminal 69, through the arm 59, cradle 5, and strand closing die 10, carried thereby, where connection is established through the strand S and the false twister pulleys 14, as previously described. It is to be noted in Fig. 13 that the flyer pulley 3 and spindle pulley 12 are provided with insulating bushings 3a and 12a, respectively, to prevent the strand S from making contact with the spindle 1 at these points. Furthermore, the spool cradle 5 is insulated from the spindle 1 by sleeves 72a and 72b to prevent any electrical connection between the spindle 1 and the cradle 5 through the cradle bearings 6.

It is evident from the foregoing that so long as leaf spring 61 does not touch contacts 66 or 67, no electrical connection exists between terminals 69 and 70, under which conditions the motor control system is arranged to permit the machine to run continuously. Assuming that the machine is running to manufacture complete cable, and that a given strander A is operating normally, the control arm 59 of each spool of this strander will, in effect, oscillate between the dotted line positions of Fig. 5a in accordance with the pull on the wire. However, should the pull on the wire exceed a predetermined amount, as a result, for example, of a snarl in the wire on the spool 4, this excessive pull will swing the arm 59 to the extreme left-hand position indicated by dotted lines in Fig. 5a. When this occurs, the contact disk 66 will engage the spring 61, thereby completing the circuit between terminals 69 and 70, and causing the motor control system to stop the driving motor M and apply a brake to bring the machine to a stop.

By reason of the above described functioning of the control circuit of the stop motion, the entire machine will be brought to a standstill before the pull can become so great as to break the wire. If, however, the wire should break for any reason, so that there is no pull exerted through pulley 9 to the arm 59, then the arm 59 will be turned to the extreme right-hand position indicated in dotted lines in Fig. 5a. This movement will occur immediately following a break in the wire, due to the pull of the springs 53 on the brake shoe 52, thereby causing the contact disk 67 to engage the spring 61 and complete the circuit between 69 and 70, causing stoppage of the machine as previously described. It is to be noted that operation of the stop motion in response to a breakage of any wire of a spooler also results in an increase of the pressure applied to the spool carrier 50 by the brake shoe 52, so that the spool 4 will not overrun.

The action described above, however, will not stop the machine in the event of breakage of the completed strand S at any point between die 13 and pulley 12, since the strand itself is used to carry the stop signal. To insure stoppage of the machine upon breakage of S between these points, a contact plate 73 is located between false twister F and closing die D. This plate is provided with a clearance hole through which the strand passes without touching the plate when the strand is under tension and therefore straight, as in normal operation. Plate 73 is connected electrically to terminal 70, but is insulated from the rest of the machine. If the strand S breaks between pulley 12 and die 13, the portion of the strand between die 13 and cable closing die D will become slack and will strike against the periphery of the clearance hole in plate 73, thereby establishing an electrical connection through the strand between plate 73 and false twister F, and hence between terminals 69 and 70. This causes the motor control to stop the machine, as later described in detail, through the functioning of the tube 68 as quick-acting relay to hold the motor circuit open, even though the closure of the circuit across terminals 69 and 70 be of extremely short duration.

As previously noted, the cable storage spool E is driven through an automatically controlled friction clutch 43, so as to transmit only enough power to the spool shaft 33 to cause the spool E to wind completed cable at the delivery rate of the capstan rolls R, and without subjecting the cable to any appreciable tension, such as would interfere with its free self-rotation within the tube 31 of the cable storing flyer C. In the absence of such a variable drive for the storage spool E, the tension on the cable would be decreased as the diameter of the bundle of cable on the storage spool increases.

As best shown in Figs. 7 and 8, which show the construction of the cable storing flyer C on an enlarged scale, the cable passes downwardly from the pulley 39 to a first guide pulley 47 mounted on a fixed bracket 74 attached to one end of the cradle 35. From the pulley 47, the cable passes around the tension pulley 48 and then back to a second guide pulley 47a which is mounted on a bracket 75 below the laying pulley 49.

The tension pulley 48 is carried at the end of an arm 76 which extends under the countershaft 42, as indicated in dotted lines in Fig. 8, and is turnable on pivots 77, so that the pulley 48 is adapted to move in a plane substantially at right angles to the plane of the pulley 47a. It will be apparent from a consideration of Fig. 8 that the tension pulley 48 is located between the guide pulley 47a and the pivots 77 for the arm 76, so that the pull of the cable, as it is wound on the storage spool E, tends to turn the arm 76 in a clockwise direction, as viewed in Fig. 8.

Referring now to Fig. 9, it will be seen that the friction clutch 43 is mounted on the end of the countershaft 42 which also carries one of the gears 44 for driving the shaft 45 which, in turn, drives the spool shaft 33. The countershaft 42 is capable of axial movement in its bearings 78, and the outer end of the countershaft 42 is normally subjected to a pressure for engaging the clutch 43 with the face of the driving gear 41. The arrangement for holding the clutch engaged consists of an arm 79 which, as best shown in Fig. 8, is mounted on the same pivot 77 as the arm 76 and is turnable therewith. A spring 80 connected between the arm 76 and a fixed point on the cradle 35 serves to hold the free end of the arm 79 in engagement with the outer end of the countershaft 42, and thereby hold the clutch 43 engaged with a predetermined pressure. Small adjustments in the degree of this pressure can be made by means of a stud 81 at the end of the arm 79, which stud is pointed at its end, so as to be received in a seat 82 in the outer end of the countershaft 42.

When the machine is started in operation to make completed cable for winding on the storage spool E, the pressure exerted by the arm 79 on the end countershaft 42 is initially adjusted by the stud 81, so as to engage the clutch 43 with a predetermined pressure. This initial setting is such as to cause the clutch 43 to transmit only enough power to the spool shaft 33 to insure rotation of the spool E at a rate just sufficient to wind the cable at the delivery rate of the capstan rolls R, without appreciable tension. However, this initial setting of the clutch would not suffice to maintain a constant small winding tension, because of the fact that as the diameter of the bundle of cable being wound on the spool E increases, the spool would exert a reduced pull on the cable being wound.

With the above described mounting of the tension pulley 48 on the arm 76, it is obvious that as the cable passes around the pulley 48 in its travel between the guide pulleys 47 and 47a, the arm 76 will be subjected to a turning moment in a clockwise direction, as viewed in Fig. 8. This turning moment is opposite to the turning moment in a counterclockwise direction set up by the pull of the spring 80 attached to the arm 79. Thus, an increase in the tension of the cable, as it is wound on the spool E, will cause the arm 76 to turn clockwise against the pull of the spring 80, and thereby cause the short arm 79 to exert a reduced pressure on the end of the countershaft 42, while a decrease in cable tension will result in an increased pressure on countershaft 42.

The net result of the above described functioning of the tension pulley 48 is that as the diameter of the bundle of cable being wound on the spool E increases, any tendency for the pull on the cable to decrease will be automatically compensated for by an increase in the pressure applied by the arm 79 to the end of the countershaft 42 by pull of spring 80, with a corresponding increase in the pressure exerted by the clutch 43 on the face of the driving gear 41. Therefore, as the winding of the cable proceeds, just enough power is transmitted to the spool shaft 33 to cause rotation of the spool and the winding of the cable thereon at a rate corresponding to the delivery rate of the cable by the capstan rolls, all without appreciable tension in the cable being wound.

In the foregoing description of the general construction and operation of the machine, it has been stated that the speed of each strander spindle 1 shall be such as to produce a specified strand twist, while the speed of the flyer C shall be such as to produce a specified cable lay twist. As an illustration of the manner in which the rotative speeds of these elements, as well as the rotative speeds of the false twister spindles 16 and the capstan unit B are related to the characteristics of the final cable, there will next be described the manner in which the machine is operated to produce a specified type of cable.

In considering the mode of operation of the machine to produce a particular type of cable, let it be assumed that the cable to be produced shall have a specified strand twist of 7.76 turns per inch, right-hand lay, and a specified cable lay twist of 3.03 turns per inch, left-hand lay. Let it also be assumed that it is desired to operate each strander at such a speed that it will double twist each strand and deliver the strands to the flying capstan for twisting into cable at a delivery rate of at least 50 feet per minute. It is to be noted that the manufacture of completed cable as fast as 50 feet per minute is an extremely high production rate as compared to existing machines.

In order to obtain the above mentioned cable production rate of 50 feet per minute, it is necessary to drive each strander spindle at a speed of 3500 R. P. M., so that the double twist flyer will twist each strand at a rate of 7000 twists per minute. In order to prevent torsioning of each strand during the cable closing operation, the strander must produce not only the specified strand twist of 7.76 turns per inch, but must also produce an additional 3.03 turns per inch of back-rotation for the cable closing operation, a total of 10.79 turns per inch.

Coming now to the rate at which the capstan rolls R must be driven to produce a twist of 10.79 turns in each inch of wire travel, it is obvious that the capstan rolls must pull the cable through the machine at a linear speed of 648.8 inches per minute, which speed is obtained by dividing 7000, the total number of strand twists per minute, by 10.79, the required number of turns per inch to be produced by each strander. It is to be noted that the cable production rate of 648.8 inches per minute is somewhat in excess of 50 feet per minute.

In order to render each strand inert before it enters the cable closing die, it must be over-twisted and then allowed to untwist, this result being obtained by passing each strand around the rolls 16 of the false twister F.

Assuming a desired strand over-twist of 1.3 turns per inch, and realizing that the flyers A are actually applying 7.76 turns per inch to the strands, it is clear that in applying an over-twist of 1.3 turns per inch, the strands would, of necessity, be twisted on one side of the false twisters F a total of 9.06 twists per inch. Therefore, by multiplying 648.8, the speed of feed, by 9.06, the strand twist per inch of travel, there results a total of 5877.7 of strand twists per minute necessary to produce such an over-twist. Thus, with the flyers producing 7000 twists per minute, it would appear that it is necessary to rotate the flyers an amount equal to 7000—5877.7 or 1122.3 R. P. M., in oder to produce the desired over-twist of 1.30 twist per inch.

In order to close the cable with the specified cable lay twist of 3.03 turns per inch, while the capstan rolls are drawing the cable at 648.8 inches per minute, the flyer C must be driven at a speed of 982.9 R. P. M., which figure is obtained by multiplying the cable speed of 648.8 inches per minute by 3.03, the turns per inch, and then dividing the result by 2, for the reason that the flyer C produces two cable twists for each revolution thereof. Since the capstan unit B travels at twice the speed of the flyer C, as above indicated, its actual speed must be two times 982.9 or 1965.8 R. P. M.

The figures given above are purely illustrative and only represent the conditions to be met in order to produce a cable having a specified strand twist and a specified cable lay twist. Obviously, the figures given will vary according to the strand twist and cable lay twist that may be desired, and also according to the hardness of the wire W. That is to say, other wire might require either more or less than 1.3 turns per inch of over-twist to render the strand inert.

As previously pointed out, the entire machine is driven from an electrical motor M, and the manner in which all the various parts of the machine are driven from the motor is indicated diagrammatically in Fig. 1, and in detail in Fig. 10. As shown, the motor M is mounted at the base of a frame 83 which carries the stranders A, with the motor being connected by a belt 84 to a pulley 85 on a power shaft 86. The shaft 86 is connected by a chain 87 and sprockets 87a to a sleeve 88 surrounding the spindle 1 of the central strander A, and this sleeve 88 is utilized to drive all the other stranders of the machine. The shaft 86 also serves to drive a countershaft 89 which extends along the machine beneath the frame 90 on which the false twisters F and flyers B and C are mounted.

As best shown in Fig. 10, the sleeve 88 of the central strander A carries a gear 91 in mesh with a gear 92 mounted on a short shaft 93 that is inclined with respect to the central spindle 1 and is parallel to the spindle of one of the stranders outside of the central strander on the frame 83. This arrangement is duplicated for each of the other stranders mounted on the frame 83, so that the spindle 1 of each strander A is driven through a chain 94 engaging with sprockets 95 on the short shaft 93 and each outside spindle 1, respectively.

The drive for the countershaft 89 is obtained from the power shaft 86 through a chain 96 and sprockets 97, with the chain 96 also driving the central spindle 1, through sprocket 97a. The countershaft 89 serves to drive the sprockets 21 and 24 of the flyer B and the sprockets 29 of the flyer C by means of the chains 98 and 99 indicated by the dot and dash lines in Fig. 1. The false twister spindles 16 are also driven from the countershaft 89 through the chains 100 and sprockets 101 and 102. As best shown in Fig. 11, the central spindle 16 is driven by sprocket 101, while the sprocket 102 drives a sleeve 103 surrounding the central spindle, which sleeve 103, in turn, drives the surrounding spindles 16 through the gearing 17. Thus, all parts of the machine are driven from a common source of power represented by the motor M, with the gear ratios being such as to give the rotative speeds previously set forth.

In the previous discussion of the functioning of the electrical stop motion associated with each strander wire W, reference has been made to the control circuit for the motor M as represented by the wiring diagram of Fig. 13. This control circuit must meet certain requirements, the most important of which is that any closure of the circuit between terminals 69 and 70, must cause deenergization of the motor M and application of a brake, no matter how short the period of such circuit closure. Means must also be provided for manually starting or stopping the machine, or to operate the machine for short periods, even though the control circuit is open, as when "jogging" the machine preparatory to setting it up for normal operation.

Fig. 13 shows one way of fulfilling these requirements, wherein the circuit employs the previously mentioned gas-filled Thyratron tube 68. This tube, when operated from a source of direct current voltage has the property of acting as a rapid latch-up relay, i. e. once the tube fires and starts conducting from cathode to anode, current will continue to flow regardless of grid voltage, as long as plate voltage is present.

The filament voltage for the tube 68 is supplied from a transformer 104 upon closure of switch 105 leading to an alternating current supply, and a time delay relay 106 is also operated from this filament supply. The purpose of this relay 106 is to prevent the main magnetic contactor 107 from being closed until the filament of the tube 68 has had sufficient time to heat. After the time delay of relay 106 has lapsed, its contact 108 closes, and the machine may now be started, provided there is no circuit between points 69 and 70.

Closure of the "Start" switch 109, a normally open momentary contact control button, causes the coil 110 of the contactor 107 to be energized, closing contacts 111 and 112. The contactor 107 locks in electrically through contact 112, and voltage is applied to the motor M and the magnetic brake 113, thus releasing the brake and starting the motor. Alternating current voltage is now applied to a tube supply transformer 114, the output voltage of which is applied to a bridge rectifier 115, which is of the copper oxide or selenium type, and this causes a direct current voltage to appear between points 116 and 117.

A filter condenser 118 is provided across the source of plate voltage supply between the points 116 and 117, and it will be seen that this source of voltage is impressed across a voltage divider consisting of resistors 119 and 120. This is done to create a source of negative grid bias voltage at point 121, with respect to the cathode of the tube 68. As long as no connection is made between points 69 and 70, this negative bias potential is impressed upon the control grid of tube 68, and is sufficient to prevent the tube from conducting. Thus, under conditions of normal operation, no current flows in the plate circuit of the tube 68, so that the contact 122 of a trip relay 123 remains closed and the machine continues to run.

Should control terminals 69 and 70 become electrically connected, even if only for $1/1000$ second, due to abnormal operation of the cable-making machine as previously described, the grid of the tube 68 is brought to ground potential and the tube fires, and remains conducting even though the previously closed circuit from 69 to 70 is reopened.

The flow of current in the plate circuit of the tube 68 causes relay 123 to be energized, which, in turn, causes its contact 122 to open. This breaks the lock-in circuit of the magnetic contactor 107, which was from L—1 through contactor coil 110, trip relay contact 122, time delay relay contact 108, "Stop" button 124, "Jog" button 125, and lock-up contact 112 of the contactor back to L—3. This causes the contactor 107 to open since its coil 110 is deenergized; this in turn deenergizes the motor M and applies the brake 113. It will also be seen that opening the contactor 107 cuts off the source of alternating current voltage to transformer 114, thus causing the tube 68 to be extinguished. This allows contact 122 to reclose, but the contactor 107 does not reclose because lock-up contact 112 is now open.

The machine can be inched by holding down the "Jog" button 125 which by-passes the trip relay contact 122 and the time delay relay contact 108, but the contactor will not lockup. The circuit between terminals 69 and 70 must, however, be open before the machine may be started by the button 109, because trip relay contact 122 reopens immediately upon application of plate voltage to the tube 68, and the contact 122 will remain open for as long as the control grid of the tube is held at ground potential.

In the foregoing description of the electrical control for the driving motor M, it has been assumed that the entire machine would be driven by a single motor. It is obvious, however, that separate motors can be employed for driving the individual strander spindles 1 and the countershaft 89, thereby eliminating much of the gear and chain drives shown in Fig. 10. In the event of using an individual motor drive, the electrical control circuit shown in Fig. 13 would remain substantially unchanged, with all of the motors being connected to, or disconnected from, the power source through the functioning of the main contactor 107, as described above. The above described automatic operations of the stop motion, as well as the tension control, are more fully described and claimed in our copending divisional application, Serial No. 94,062, filed May 19, 1949.

Furthermore, the machine is so constructed that it is capable of being operated in a somewhat different manner than as described above, without alteration of its basic mechanisms. For example, should it be desired to manufacture cable having a core strand of opposite twist to that of the outer strands, the central strander A may be arranged to run opposite to its normal direction of rotation by suitable modification of its gearing. The central false twister F is then geared to run in its original direction of rotation, but at increased speed, because the central strand S now subtracts from the back-rotation during cable closing rather than adding to it as formerly. To produce the same strand twist per inch as formerly, the speed of the oppositely-rotating central strander is reduced.

Should it be desired to make a cable with a non-metallic core, such as a twisted fibrous material, or a single filament of nylon or other plastic, this may be done by loading one or more of the spools on the central strander A with the desired material. If a single filament is to be fed, only one spool is used, and the speed of the central strander flyer is reduced to produce only the back-rotation required for the cable closing operation. If a yarn or thread is to be used as a core, it may be fed from one spool of the central strander in the manner described above for a single filament. Or, if it is desired, all of the spools of the central strander may be loaded with yarn or thread which will then be twisted together to form a single core strand, in the same manner as though wire were used.

It is also evident that the central strander need not be used at all whenever it is desired to use an already finished core, such as rayon yarn or thread, without back-rotation. In such case, the central strander may be removed from the machine, and a stationary spool of core material mounted in its place. This spool, since it does not rotate bodily, may be quite large. If it is considered inconvenient to remove the central strander, the spindle 1 of same may be made hollow throughout its entire length, and the strand of core material introduced from a source outside the machine, passing through the hollow central spindle and thence directly to closing die D, the central false-twister serving merely as a guide.

From the foregoing, it is apparent that by the present invention there is provided an improvement in the manufacture of stranded wire cable, wherein a plurality of single wires, as drawn from individual spools, are grouped for twisting into strands and the strands brought together for twisting into a cable that is stored as it is formed, with all of the above operations being performed as a continuous process in which the wire supplies partake of no motion except that of unwinding from the spools, and the stored cable partakes of no motion, except that of winding on the storage reel. As a result, the machine of the present invention is capable of being operated at a high rate of production, which would not be possible of attainment with bodily movement of either wire supplies or stored cable about axes of revolution.

We claim:

1. Apparatus for the manufacture of wire cable comprising in combination a plurality of groups of supply reels carrying untwisted wire, a rotatably driven flyer associated with each group of reels and adapted to impart a double twist to a strand composed of wires drawn from said reels, a cable closing die for receiving twisted wire strands converging upon said die from said groups of supply reels, a false twister located between said die and each group of supply reels and means for driving all of said false twisters in unison to uniformly kill the strands passing through said twisters in advance of entering said cable closing die.

2. The improvement in the manufacture of cable which consists in providing a supply of single filaments, subjecting groups of the filaments to a twisting action to form a plurality of separate strands, false twisting each of said separate strands, assembling all of the strands together so as to form an elongated strand bundle, exerting a feeding action upon the strand bundle thereby to pull the strands past their assembly area and to urge them toward a cable-storing drum upon which the cable is wound, forming the strands into a cable by rotating the strand bundle completely about the drum while the forward ends of the strands are fast to the drum and unable to twist about their longitudinal axes, and winding the laid cable upon the drum.

3. The improvement in the manufacture of cable which consists in providing a supply of unassociated strands of finite length, assembling all of the strands together into an elongated strand bundle, positively feeding the strand bundle continuously away from its assembly point and toward a cable-storing drum while simultaneously twisting the bundle intermediate its ends about its longitudinal axis thereby to cause the strands to be laid about each other in cable fashion at their assembly area, revolving the strand bundle completely about the cable-storing drum in the same direction as and at a speed one-half of that of the first mentioned twisting action with the forward ends of the strands secured to the drum so as to prevent them from rotating about their longitudinal axes thereby to form a permanent cable lay twist in the strands, and winding the cable upon the cable-storing drum.

4. The improvement in the manufacture of cable which consists in providing a supply of single filaments, subjecting groups of the filaments to a twisting action to form a plurality of unassociated strands, directing all of the strands through a cable-closing die thereby to assemble the strands into an elongated bundle, positively feeding the strand bundle continuously away from the die and towards a cable-storing drum while simultaneously twisting the bundle intermediate its ends about its longitudinal axis thereby to cause the strands to be laid about each other in cable fashion as they pass through the die, revolving the strand bundle continuously and completely about the cable-storing drum at a speed one-half that at which the first mentioned twisting action takes place with the forward ends of the strands secured to the drum so as to prevent them from rotating about their longitudinal axis thereby to form a permanent cable lay twist in the strands, and winding the cable upon the cable-storing drum.

5. The improvement in the manufacture of cable which consists in providing a supply of single filaments, subjecting groups of the filaments to a twisting action to form a plurality of unassociated strands, directing all of the strands through a cable-closing die thereby to assemble the strands into an elongated bundle, positively feeding the strand bundle continuously away from the die and towards a cable-storing drum while simultaneously twisting the bundle intermediate its ends about its longitudinal axis thereby to cause the strands to be laid about each other in cable fashion as they pass through the die, revolving the strand bundle continuously and completely about the cable-storing drum in the same direction as and at a speed one-half of that of the first mentioned twisting action with the forward ends of the strands secured to the drum so as to prevent them from rotating about their longitudinal axes thereby to form a permanent cable lay twist in the strands, and winding the cable upon the cable-storing drum without imparting any appreciable tension upon the strands as they are twisted.

6. The improvement in the manufacture of cable which consists in directing a plurality of unassociated strands through a cable-closing die thereby to assemble the strands into an elongated strand bundle, imparting a feeding action to the strand bundle so as to pull it through the die, accompanied by a twisting action for rotating the strand bundle intermediate its ends about its longitudinal axis thereby to lay the strands about each other in cable fashion as they pass through the die, and finally rotating the strand bundle continuously about the forward ends of the strands at a speed one-half that at which said twisting action takes place while such ends are held from rotating about their longitudinal axes, thereby to impart a permanent cable lay twist to the strands.

7. The improvement in the manufacture of cable which consists in directing a plurality of unassociated strands through a cable-closing die thereby to assemble the strands into an elongated strand bundle, imparting a feeding action to the strand bundle so as to pull it through the die, accompanied by a twisting action for rotating the strand bundle intermediate its ends about its longitudinal axis thereby to lay the strands about each other in cable fashion as they pass through the die, and finally rotating the strand bundle continuously about the forward ends of the strands in the same direction as and at one-half the speed of that of the first mentioned twisting action while such strand ends are held from rotating about their longitudinal axes thereby to impart a permanent cable lay twist to the strands, which permanent twist is similar in lay and has the same number of twists per inch of cable length as that which was imparted to the strand bundle as the strands were drawn through the die.

8. The improvement in the manufacture of cable which consists in directing a plurality of unassociated strands through a cable-closing die thereby to assemble the strands into an elongated strand bundle, imparting a feeding action to the strand bundle so as to pull it through the die and urge it toward a cable-storing drum, such feeding action being accompanied by a twisting action for rotating the strand bundle intermediate its ends and about its longitudinal axis thereby to lay the strands about each other in cable fashion as they pass through the die, rotating the strand bundle continuously and completely about the drum while the forward ends of the strands are held by the drum from rotating about their longitudinal axes, thereby to impart a permanent cable lay twist to the strands, supporting the strands continuously from their feeding area to the cable-storing drum so as to render the feeding action effective to deliver the strands to the drum, and finally winding the cable upon the drum without imparting any appreciable tension to the cable.

9. Apparatus for the manufacture of cable comprising in combination, a cable-closing die adapted for receiving a plurality of converging strands, a cable-storing drum, a cable flyer rotatably driven about said drum for imparting a predetermined cable lay twist to said strands, said cable flyer including a guide tube for guiding the laid cable to said drum, a capstan roll interposed between said closing die and said cable flyer, means for positively rotating said capstan roll about its normal axis of rotation for drawing the strands through said die and for feeding the cable through said guide tube to said drum, and means for positively rotating said capstan roll bodily about the cable axis, at a speed twice that at which said cable flyer is rotated.

10. Apparatus for the manufacture of cable comprising in combination, a cable-closing die adapted for receiving a plurality of converging strands, a cable-storing drum, a cable flyer of the double twist type rotatably driven about said drum for imparting a predetermined cable lay twist to said strands, said cable flyer including a guide tube for guiding the laid cable to said drum, a capstan roll over which the cable is wound interposed between said closing die and said cable flyer for drawing the strands through said die and for feeding the cable through said guide tube to said drum, means for positively rotating said capstan roll about its normal axis of rotation and bodily about the cable axis at a speed twice that of said cable flyer, means for rotating said cable-storing drum so as to wind the cable thereabout, and means for automatically preventing said last mentioned means from imparting any appreciable tension to the cable as it is fed through said guide tube.

11. Apparatus for the manufacture of cable comprising in combination, a cable-closing die adapted for receiving a plurality of converging strands, a cable-storing drum, a cable flyer of the double twist type rotatably driven about said drum for imparting a predetermined cable lay twist to said strands, said cable flyer including a guide tube for guiding the laid cable to said drum, a capstan unit interposed between said closing die and said cable flyer for drawing the strands through said die and for feeding the cable through said guide tube to said drum, said capstan unit including a flyer plate positively rotated about the axis of the cable at twice the speed of said cable flyer, a positively driven capstan roll over which the cable is wound, said capstan roll being mounted upon said flyer plate with its axis of rotation disposed at right angles to that of said plate, means for rotating said cable-storing drum so as to wind the laid cable thereon, and means for automatically preventing said last mentioned means from applying any appreciable tension upon the cable as it is fed through said guide tube.

12. Apparatus for the manufacture of cable comprising in combination, means for supporting a supply of single filaments, means for imparting a predetermined strand twist to selected groups of filaments, as drawn from said filament supply, means for false twisting each strand of filament, cable-storing means, cable-forming means for imparting a predetermined cable lay twist to said strands and for guiding such laid cable toward said cable-storing means, and means interposed between said filament supply and said cable-forming means for drawing off filaments from said supply and for feeding the same through said cable-forming means and to said cable-storing means.

13. Apparatus for the manufacture of cable comprising in combination, means for supporting a supply of single filaments, means for imparting a predetermined strand twist to selected groups of filaments, as drawn from said filament supply, means for false twisting each strand of filament, a cable-storing drum, cable-forming means for imparting a predetermined cable lay twist to said strands and for directing such laid cable toward said cable-storing drum, means interposed between said filament supply and said cable-forming means for drawing off filaments from said supply and for feeding the same through said cable-forming means and to said cable-storing drum, means for rotating said drum so as to wind the laid cable thereon, and means automatically to control said last mentioned means so as to prevent it from imparting any substantial tension to said cable.

14. Apparatus for the manufacture of cable comprising in combination, a plurality of groups of supply reels carrying single filaments, a rotatably driven strand flyer of the double twist type associated with each group of reels for imparting a predetermined strand twist to a strand composed of filaments drawn from said reels, means for false twisting each strand, a cable-storing drum, a rotatably driven cable flyer of the double twist type associated with said cable-storing drum for imparting a predetermined cable lay twist to said strands, a positively driven capstan roll interposed between said supply reels and said cable flyer for drawing the filaments off said reels, through said strand flyer and for feeding the same through said cable flyer and to said cable-storing drum, means for rotating said drum so as to wind the laid cable thereon, and means automatically to control said last mentioned means so as to prevent it from imparting any substantial tension to said cable.

15. Apparatus for the manufacture of cable comprising in combination, a plurality of groups of supply reels carrying single filaments, a rotatably driven strand flyer of the double twist type associated with each group of reels for imparting a predetermined strand twist to a strand composed of filaments drawn from said reels, means for false twisting each strand as it leaves its associated strand flyer, a cable-storing drum, a rotatably driven cable flyer of the double twist type associated with said cable-storing drum for imparting a predetermined cable lay twist to said strands, and a positively driven capstan roll interposed between said false twisting means and said cable flyer for drawing the strands from said false twisters and for feeding the same through said cable flyer and to said cable-storing drum.

16. Apparatus for the manufacture of cable comprising in combination, a plurality of groups of supply reels carrying single filaments, a rotatably driven strand flyer of the double twist type associated with each group of reels for imparting a predetermined strand twist to a strand composed of filaments drawn from said reels, means for false twisting each strand, a cable-storing drum, a cable flyer of the double twist type rotatably driven about said drum for imparting a predetermined cable lay twist to said strands, a cable-closing die disposed between said strand and cable flyers for receiving the twisted filament strands converging upon said die from said strand flyers, and a positively driven capstan roll interposed between said cable-closing die and said cable flyer for drawing the strands through said die and for feeding the same through said cable flyer and to said cable-storing drum.

17. Apparatus for the manufacture of cable comprising in combination, means for supporting a supply of single filaments, means for imparting a predetermined strand twist to selected groups of filaments, as drawn from said filament supply, cable-storing means, cable-forming means for imparting a predetermined cable lay twist to said strands and for guiding such laid cable toward said cable-storing means, a capstan roll interposed between said filament supply and said cable-forming means, means for positively rotating said capstan roll about its normal axis of rotation for drawing off filaments from said supply and for feeding the same through said cable forming means and to said cable-storing means, and means for positively rotating said capstan roll bodily about a second axis disposed at right angles to its normal axis of rotation and in parallelism with the direction of strand feed thereby to cause the strands to be laid into cable as the strands are drawn into said capstan.

18. Apparatus for the manufacture of cable comprising in combination, a plurality of groups of supply reels carrying single filaments, a rotatably driven strand flyer of the double twist type associated with each group of reels for imparting a predetermined strand twist to a strand composed of filaments drawn from said reels, a cable-storing drum, a cable flyer of the double twist type rotatably driven about said drum for imparting a predetermined cable lay twist to said strands, a cable-closing die disposed between said strand and cable flyers for receiving the twisted filament strands converging upon said die from said strand flyers, a capstan roll interposed between said cable-closing die and said cable flyer, means for positively rotating said capstan roll about its normal axis of rotation for drawing the strands through said die and for feeding the laid cable through said cable flyer and to said cable-storing drum, and means for positively rotating said capstan roll bodily about a second axis disposed at right angles to its normal axis of rotation and in parallelism with the direction of cable feed for causing the strands to be laid into cable as the strands are drawn into said die.

19. Apparatus for the manufacture of cable comprising in combination, a plurality of groups of supply reels carrying single filaments, a rotatably driven strand flyer of the double twist type associated with each group of reels for imparting a predetermined strand twist to a strand of filaments drawn from said reels, a cable-storing drum, a cable flyer of the double twist type rotatably driven about said drum for imparting a predetermined cable lay twist to said strands, said cable flyer including a cable guide tube for guiding the cable to said cable-storing drum, a cable-closing die disposed between said strand and cable flyers for receiving the twisted filament strands converging upon said die from said strand flyers, a capstan roll interposed between said cable-closing die and said cable flyer for drawing the strands through said die and for feeding the laid cable through said guide tube and to said cable-storing drum, means for positively rotating said capstan roll about its normal axis of rotation and bodily about a second axis disposed at right angles to its normal axis of rotation and in parallelism with the direction of cable feed, means for rotating said cable-storing drum so as to wind the laid cable thereabout, and means automatically to prevent said last mentioned means for imposing any appreciable tension upon the cable as the latter is fed through said guide tube.

20. Apparatus for the manufacture of cable comprising in combination, a plurality of groups of supply reels carrying single filaments, a rotatably driven strand flyer of the double twist type associated with each group of reels for imparting a predetermined strand twist to a strand of filaments drawn from said reels, a cable-storing drum, a cable flyer of the double twist type rotatably driven about said drum for imparting a predetermined cable lay twist to said strands, said cable flyer including a cable guide tube for guiding the cable to said cable-storing drum, a cable-closing die disposed between said strand and cable flyers for receiving the twisted filament strands converging upon said die from said strand flyers, a capstan unit interposed between said cable-closing die and said cable flyer for drawing the strands through said die and for feeding the laid cable through said guide tube and to said cable-storing drum, said capstan unit including a flyer plate positively rotated about the cable axis and at twice the speed of said cable flyer, a positively driven capstan roll over which the cable is wound, said capstan roll being mounted upon said flyer plate with its axis of rotation disposed at right angles to that of said flyer plate, means for rotating said cable-storing drum so as to wind the laid cable thereabout, and means automatically to prevent said last mentioned means from imposing any appreciable tension upon the cable as the latter is fed through said guide tube.

21. Apparatus for the manufacture of cable comprising in combination a plurality of groups of supply reels carrying single filaments, a rotatably driven strand flyer of the double twist type associated with each group of reels for imparting a predetermined strand twist to a strand of filaments drawn from said reels, means for false twisting each strand as it leaves its associated strand flyer, a cable-storing drum, a cable flyer of the double twist type rotatably driven about said drum for imparting a predetermined cable lay twist to said strands, said cable flyer including a cable guide tube for guiding the cable to said cable-storing drum, a cable-closing die disposed between said false twisting means and said cable flyer for receiving the twisted filament strands converging upon said die from said false twisting means, a capstan roll interposed between said cable closing die and said cable flyer for drawing the strands through said die and for feeding the laid cable through said guide tube and to said cable-storing drum means for positively rotating said capstan roll about its normal axis of rotation and bodily about the cable axis, means for rotating said cable-storing drum so as to wind the laid cable thereabout, and means automatically to prevent said last mentioned means from imposing any appreciable tension upon the cable as the latter is fed through said guide tube.

FRANK A. CLARY, Jr.
GRANT N. WILLIS.

REFERENCES CITED

The following references are of record in the file of this patent:

UNITED STATES PATENTS

| Number | Name | Date |
|---|---|---|
| 691,797 | Norman | Jan. 28, 1902 |
| 723,178 | Norman | Mar. 17, 1903 |
| 1,031,366 | Norman | July 2, 1912 |
| 1,031,367 | Norman | July 2, 1912 |
| 1,436,312 | Grondahl | Nov. 21, 1922 |
| 1,907,551 | Kraft | May 9, 1933 |
| 1,981,134 | Weaver | Nov. 20, 1934 |
| 1,983,413 | Spagnolo | Dec. 4, 1934 |
| 1,995,533 | Bochman et al. | Mar. 26, 1935 |
| 2,294,634 | Scott et al. | Sept. 1, 1942 |
| 2,317,113 | Reichelt | Apr. 20, 1943 |
| 2,331,648 | Berggren et al. | Oct. 12, 1943 |

FOREIGN PATENTS

| Number | Country | Date |
|---|---|---|
| 406,801 | Great Britain | Mar. 8, 1934 |
| 745,096 | France | Feb. 7, 1933 |